July 4, 1961
V. L. STONE
2,990,555
WATER CLOSET TANK BALL SEAT
Filed June 10, 1957
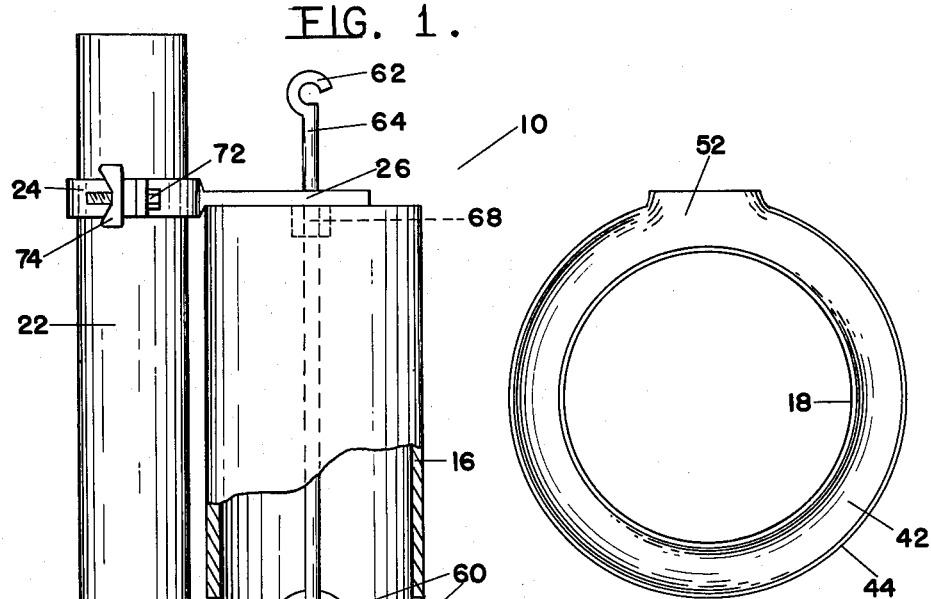
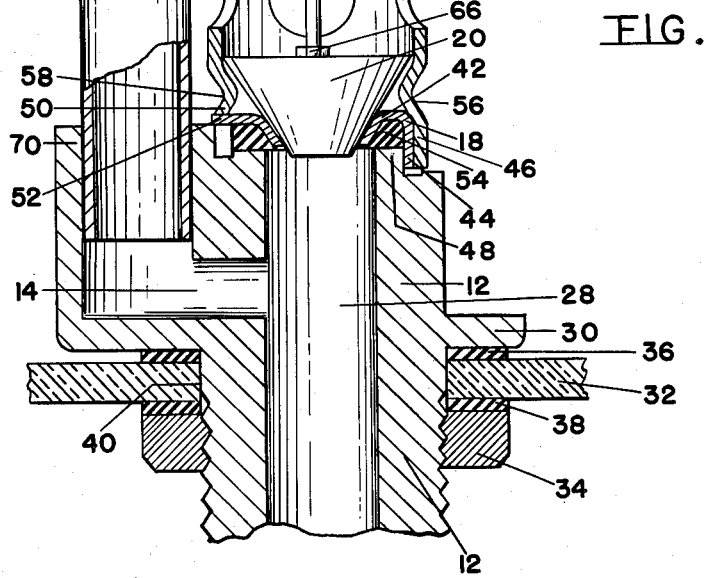
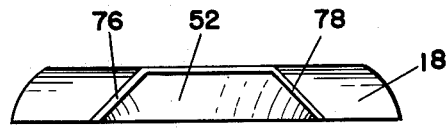
V. L. STONE *INVENTOR.*
BY *Arthur H. Sturges*
*Attorney*

United States Patent Office 2,990,555
Patented July 4, 1961

2,990,555
WATER CLOSET TANK BALL SEAT
Vivien L. Stone, 811 Vincil St., Moberly, Mo.
Filed June 10, 1957, Ser. No. 664,548
2 Claims. (Cl. 4—57)

This invention relates to outlet valves of flush tanks of toilet bowls wherein a ball or bulb is elevated by a hand lever to permit water to flush from the tank, and wherein a float closes a supply valve when water in the tank reaches a predetermined level, and in particular a removable valve seat positioned in the lower end of a cylindrical guide, having outlet openings therein, with the guide clamped on a fitting extended through the base of a flush tank and having a branch connection for an overflow pipe extended from one side, and a valve element slidably mounted in the cylindrical guide and positioned to coact with the valve seat.

The purpose of this invention is to provide an outlet valve for the flush tank of a toilet bowl in which the ball or valve element is retained in alignment with a valve seat continuously, and in which the seat is readily renewable.

Various types of mechanical devices have been provided for retaining balls of valves of flush tanks in alignment with a valve seat in the tank, however, with all of such devices the balls are influenced toward one side and do not always close the valve. Furthermore, valves used in flush tanks are subjected to wear due to grit and other foreign matter carried by the water, and it is desirable to form the valves so that the valve seat may readily be replaced.

With these thoughts in mind this invention contemplates a thin metal valve seat having a sealing washer therein positioned in the lower end of a cylindrical ball or valve element guide, a valve element positioned in the guide, a fitting having a bore therethrough and upon which the valve element guide is positioned, an overflow tube positioned in a branch connection of the fitting, and a bracket on the overflow tube and having an arm extended over the upper end of the guide for clamping the guide upon the fitting.

The object of this invention is, therefore, to provide a guide for a ball or valve element of the outlet valve of a flush tank of a toilet bowl wherein the valve element is retained in alignment with a valve seat continuously.

Another object of the invention is to provide a seat for a flush tank outlet valve in which the seat is readily replaceable.

Another important object of the invention is to provide a flush tank outlet valve in which a valve element is retained in alignment with a valve seat by a cylindrical guide and in which the valve seat is replaceable in which the device is adapted to be installed in conventional flush tanks of toilet bowls.

It is yet another object of the invention to provide an improved valve for flush tanks of toilet bowls in which a replaceable valve seat is held by a press fit in the lower end of a cylindrical valve guide whereby the valve seat is readily removable and replaceable.

A further object of the invention is to provide a cylindrical valve guide for the outlet valve of a flush tank in which a valve element or ball in the guide is designed to be connected to conventional valve actuating instrumentalities.

A still further object is to provide a cylindrical valve guide and a replaceable valve seat for outlet valves of flush tanks of toilet bowls in which the valve assembly is of a simple and economical construction.

With these and other objects and advantages in view the invention embodies a fitting formed to be installed in an opening in the base of a toilet bowl flush tank, a cylindrical valve guide having openings in the lower part and having a valve seat in the lower end positioned on the fitting, a valve element having a rod extended upwardly therefrom positioned in the valve guide and formed to slide vertically therein, an overflow tube extended from a branch connection of the fitting, and a bracket on the overflow tube and having an arm extended over the upper end of the cylindrical valve guide providing means for clamping the guide upon the fitting.

Other features and advantages of the invention will appear from the following description taken in connection with the drawings, wherein:

FIGURE 1 is a vertical section through an outlet valve fitting of a flush tank of a toilet bowl with part of an overflow tube and cylindrical valve guide shown in elevation, and with the fitting mounted in the base of a flush tank.

FIGURE 2 is a plan view showing a valve seat formed to be positioned in the lower end of the valve guide shown in FIGURE 1, with the parts shown on an enlarged scale.

FIGURE 3 is a side elevational view of the valve seat shown in FIGURE 2, showing a lip at one side of the seat.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating the body of a fitting having a branch connection 14, numeral 16 a cylindrical valve element guide positioned on the fitting, numeral 18 a valve seat or renewal lining member positioned in the guide, numeral 20 a ball or frustro-conical shaped valve element positioned in and free to slide in the guide 16, numeral 22 an overflow tube extended from the branch connection of the fitting, and numeral 24 a bracket clamped to the overflow tube and having an arm 26 pressing downwardly for clamping the cylindrical guide upon the valve fitting.

The fitting 12 is provided with a bore 28 and a flange 30 thereof is clamped against the inner surface of the base 32 of a toilet bowl flush tank by a lock nut 34 which is threaded on the outer surface of the fitting, as shown in FIGURE 1. Sealing washers 36 and 38 are positioned between the flange and base 32 and also between the base and lock nut 34 for sealing an opening 40 through the base.

The valve seat or lining, which is frustro-conical is provided with a horizontally disposed portion 42 and an annular flange 44 depends from the periphery of the portion 42 whereby the flange nests in the lower end portion 46 of the guide 16, and also extends around a shoulder 48 of the fitting. The flange 44 is formed with a notch 50 in which the lip 52 of the valve seat is positioned whereby the lip is positioned to be engaged by a thumb nail, screw driver or the like to remove the valve seat. A sealing gasket 54 is frictionally retained in the valve seat and the gasket is positioned to engage the end surface of the fitting to prevent leaking around the valve seat.

The lower portion of the cylindrical valve guide is provided with an annular indentation 56 which forms an annular rim 58 on the inner surface of the guide whereby the movement of the valve seat in the guide is limited, and above the rim 58 is a series of openings 60 through which water in the flush tank flows into the bore 28 of the fitting when the ball or valve element is elevated by a conventional hand lever connected to a hook 62 on the upper end of a stem 64 secured in the upper end of the valve element by a nut 66 and extended through a bearing 68 in the upper end of the guide. From the bore 28 of the fitting 12 the water passes into a toilet bowl for flushing the bowl by conventional means.

The overflow tube 22 is frictionally held in a vertically disposed section 70 of the branch connection 14 of the fitting 12 and the bracket 24, which is clamped to the overflow tube by bolts 72 having wing nuts 74 thereon, is pressed downwardly until the arm 26 clamps the valve guide 16 against the upper end of the fitting.

The lip 52 of the valve seat 18 is formed with beveled edges 76 and 78 and the notch 50 of the flange 44 is similarly shaped to facilitate nesting of the valve seat in the end of the valve guide. The valve seat is inserted in the lower end of the valve guide with a press fit so that the valve seat may be removed and installed with the valve guide.

Although the valve element 20 is illustrated as being frustro-conical shaped, it will be understood that it may be in the form of a ball, or of any other type or design.

Operation

With the parts assembled as illustrated and described, the device is installed in the opening in the base of a conventional flush tank of a toilet bowl and the hook at the upper end of the stem 64 is connected to a conventional hand lever of the tank. When it is desired to flush the toilet bowl the ball or valve element is drawn upwardly above the valve seat and the water in the flush tank rushes through the openings 60 in the valve guide passing through the bore of the fitting and conventional connections to the toilet bowl. By the use of the valve guide 16 the valve element is retained in alignment with the valve seat, and the possibility of the ball or valve element being accidentally displaced is substantially eliminated.

Valve seats of flush tanks of toilet bowls are subjected to considerable abuse, due to foreign matter in the water, and for this reason it is desirable to replace or renew such valve seats after use for certain periods of time; and when it is desired to change the valve seat it is only necessary to release the cylindrical valve guide by releasing the bracket 24 and moving the arm 26 upwardly or to one side, and the complete valve guide may be removed. With the valve guide removed the valve seat may be removed from the guide and a new seat inserted. The valve assembly may, therefore, be repaired by the average layman.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. In a flush tank outlet valve the provision of a vertically moving valve element, a fitting having an upwardly extending substantially annular shoulder, said fitting having a vertical bore therethrough extending through said shoulder, a valve seat renewal lining member positioned above the shoulder of said fitting, said valve seat renewal lining member having an annular shape providing an inner opening the wall of which is shaped for coaction with said valve element, said valve seat renewal lining member having a downwardly depending substantially annular flange around its outer edge, sealing means disposed between said lining member and said fitting shoulder to prevent leakage, said sealing means being disposed within said depending flange of said renewal lining member for retaining said sealing means in place, and an elongated upright cylindrical valve guide disposed above said lining member, the lower end of said valve guide and said lining member having portions shaped for cooperative abutment and being in abutment with each other whereby said valve guide holds said renewal lining member from undesirably rising upwardly from said fitting shoulder, and means for holding the upper end of said valve guide in place, said liner member flange being long enough to extend downwardly beyond the top of said shoulder on substantially all sides of said shoulder to hold said liner from horizontal shifting out of place, said valve guide also extending downwardly beyond the top of said shoulder and is disposed abutting said liner member flange whereby the flange holds the lower end of said guide from lateral movement.

2. In a flush tank outlet valve the provision of a vertically moving valve element, a fitting having an upwardly extending substantially annular shoulder, said fitting having a vertical bore therethrough extending through said shoulder, a valve seat renewal lining member positioned above the shoulder of said fitting, said valve seat renewal lining member having an annular shape providing an inner opening the wall of which is shaped for coaction with said valve element, said valve seat renewal lining member having a downwardly depending substantially annular flange around its outer edge, sealing means disposed between said lining member and said fitting shoulder to prevent leakage, said sealing means is a resilient gasket of annular shape, said sealing means being disposed within said depending flange of said renewal lining member for retaining said sealing means in place, and an elongated upright cylindrical valve guide disposed above said lining member, the lower end of said valve guide and said lining member having portions shaped for cooperative abutment and being in abutment with each other whereby said valve guide holds said renewal lining member from undesirably rising upwardly from said fitting shoulder, and means for holding the upper end of said valve guide in place.

References Cited in the file of this patent
UNITED STATES PATENTS

| | | |
|---|---|---|
| 1,177,443 | Pickles | Mar. 28, 1916 |
| 1,420,452 | Shoppe et al. | June 20, 1922 |
| 1,439,268 | Shoppe et al. | Dec. 19, 1922 |
| 1,462,106 | Hedges et al. | July 17, 1923 |
| 2,557,743 | Howe | June 19, 1951 |
| 2,626,399 | Blair | Jan. 27, 1953 |
| 2,745,109 | Stuart | May 15, 1956 |